US009890674B2

(12) United States Patent
Williams et al.

(10) Patent No.: US 9,890,674 B2
(45) Date of Patent: Feb. 13, 2018

(54) SILOXANE REMOVAL SYSTEM AND MEDIA REGENERATION METHODS

(71) Applicant: DCL International Inc., Concord (CA)

(72) Inventors: Shazam Williams, Toronto (CA); John Muter, King City (CA); Linjie Hu, Maple (CA); William Z. Casolara, Yucca Valley, CA (US)

(73) Assignee: Granitefuel Engineering Inc. (CA)

( * ) Notice: Subject to any disclaimer, the term of this patent is extended or adjusted under 35 U.S.C. 154(b) by 0 days.

(21) Appl. No.: 14/966,900

(22) Filed: Dec. 11, 2015

(65) Prior Publication Data
US 2017/0167334 A1    Jun. 15, 2017

(51) Int. Cl.
*F01N 3/00* (2006.01)
*F01N 3/023* (2006.01)
*F01N 3/032* (2006.01)

(52) U.S. Cl.
CPC .......... *F01N 3/0233* (2013.01); *F01N 3/032* (2013.01); *F01N 2410/04* (2013.01)

(58) Field of Classification Search
USPC ......... 60/274, 286, 287, 288, 289, 292, 293, 60/295, 298, 300, 303, 320
See application file for complete search history.

(56) References Cited

U.S. PATENT DOCUMENTS

| | | | | |
|---|---|---|---|---|
| 4,987,738 A * | 1/1991 | Lopez-Crevillen | ..... | F01N 3/025 60/286 |
| 6,464,027 B1 * | 10/2002 | Dage | ...................... | B60H 1/004 123/41.14 |
| 7,246,487 B2 * | 7/2007 | Hara | ...................... | B60H 1/025 60/285 |
| 8,042,328 B2 * | 10/2011 | Ono | ................... | B01D 53/9431 60/286 |
| 2005/0166583 A1 * | 8/2005 | Petersson | ............... | B01D 53/04 60/297 |
| 2006/0225571 A1 | 10/2006 | Higgins | | |
| 2008/0257158 A1 | 10/2008 | Howard | | |
| 2010/0139267 A1 * | 6/2010 | Schliesche | ............. | F02M 26/35 60/602 |
| 2013/0061579 A1 * | 3/2013 | Kotrba | ................. | F01N 3/0256 60/295 |
| 2014/0366726 A1 | 12/2014 | Mitariten et al. | | |

OTHER PUBLICATIONS

Notification of Transmittal of the International Search Report and Written Opinion of the International Searching Authority, dated May 12, 2017, in International Application No. PCT/162016/001842, 13 pages.

* cited by examiner

*Primary Examiner* — Binh Q Tran (74) *Attorney, Agent, or Firm* — Eric L. Sophir; Dentons US LLP (57) ABSTRACT

A method of removing impurities from a gas including the steps of removing impurities from biogas comprising at least one adsorbents via a process vessel or reactor, directing the purified gas to an device to generate power and/or heat, regenerating the saturated adsorption media with the waste heat recovered from the engine exhaust and directing the regeneration gas (hot air or engine exhaust) to flare, engine exhaust stack, or atmosphere.

10 Claims, 5 Drawing Sheets

SILOXANE REMOVAL SYSTEM AND MEDIA REGENERATION METHODS

FIELD

The present disclosure relates to devices and methods for regenerating media in a siloxane removal system.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Biogas is typically a waste product from sources including anaerobic digestion of waste materials, such as waste water sludge, animal farm manure sewage and manure, landfill wastes, agrofood industry sludge, or any source that organic waste is able to break down in an environment that is substantially free of oxygen. The biogas produced by these activities typically contains 40-60% methane, 25% to 50% carbon dioxide, 0% to 10% nitrogen, 0% to 1% hydrogen, 0% to 3% sulfur, and 0% to 2% oxygen, all by volume, as well as an assortment of trace impurities that can include siloxane, chlorine, volatile organic compounds, and ammonia.

Since biogas is typically generated from organic matter, it can be considered a renewable form of energy which can be used as a fuel for internal combustion engines and boilers to generate electricity and heat. The biogases, however, contain noxious impurities, among which may include siloxanes, hydrogen sulfide and organic sulfurs. These impurities can be harmful to the environment and can cause damage to heat and power generation devices. For example, siloxanes present in biogas produce silicon dioxide in the biogas combustion process which can be deposited within heat and power devices causing damage to internal components such as engine pistons, spark plugs, and exhaust treatment devices. The deposition of silicon dioxide within these internal components can cause premature equipment breakdown and/or require more frequent maintenance or overhauls of heat and power generation devices. It is also possible in fuel cell systems that siloxanes can be deposited on downstream catalysts forming silicates that cause an abrasion to moving equipment and breakdown of catalysts or heat exchangers.

There are various methods currently used to remove siloxanes from biogas. One siloxane removal method is known as the temperature swing process (TSP). In this process, raw biogas enters into a dual vessel bed system, where adsorbents such as activated carbons (ACs), inorganics (silica and zeolites) or polymeric resins adsorbs siloxane molecules and other harmful volatile organic compounds (VOCs), effectively removing them from the biogas stream. The purified biogas can then be used as the fuel for a gas engine. This system uses a one system design. Optionally, the system may use an adjustable cycle to alternate between processing vessels, which are regularly purged with hot gas stream during continuous operation. In another embodiment the system can also use a single vessel design. This self-regeneration system ensures the continuous operation of the process. However, there are some major problems associated with the regeneration procedure. For example, the TSP typically uses ambient air as a source to regenerate the saturated adsorbents in a temperature swing process. However, because the TSP process requires ambient air to be electrically heated to 50 to 400° C. an additional power consumption ranging from 20 to 300 kilowatts may be required for the removal process to purify 1200 SCFM (standard cubic feet per minute) of biogas. In an embodiment, the additional power consumption can range from 20 to 100 kilowatts. Accordingly, there is a need for a siloxane removal system that eliminates or reduces the additional power consumption required to heat ambient air to 50° C. to 400° C. for TSP.

SUMMARY

The present disclosure relates to a method of regenerating media in a removal system and a device for regenerating media for use in removal systems.

One embodiment provides a method of removing impurities from a gas. The method includes the steps of removing impurities from biogas comprising at least one adsorbents via a process vessel or reactor, directing the purified gas to a device to generate power and/or heat, regenerating the saturated adsorption media with the waste heat recovered from the engine exhaust and directing the regeneration gas (hot air or engine exhaust) to flare, engine exhaust stack, or atmosphere.

Another embodiment provides a method of regenerating adsorption media with waste energy in the engine exhaust, the method comprising the steps of:
receiving fuel comprising at least one hydrocarbons via an engine;
generating an engine exhaust;
directing a first portion of the engine exhaust to the atmosphere;
feeding a second portion of the engine exhaust to a vessel containing an adsorption media;
desorbing the impurities from the second portion of the engine exhaust; and
directing the second portion of the engine exhaust to an outlet.

Another embodiment provides a device for removing impurities from a gas. The device comprises an inlet for receiving fuel comprising at least one hydrocarbon connected to an engine. The device comprises a split line to separate a first portion of engine exhaust from a second portion of engine exhaust. The device includes a first outlet to feed a first portion of the engine exhaust to the atmosphere. The device further includes a vessel containing an adsorption media for receiving a second portion of the engine exhaust and a vent to receive a reformed gas from the vessel.

Another embodiment provides a method of removing impurities from a gas, the method comprising the steps of:
receiving fuel comprising at least one hydrocarbon via an engine;
generating an engine exhaust;
directing a first portion of the engine exhaust to the atmosphere;
directing a second portion of the engine exhaust towards a vessel containing an adsorption media;
injecting an air source into a second portion of the engine exhaust; and
feeding a mixture of the second portion of the engine exhaust and the air source to the vessel;
desorbing the impurities from the second portion of the engine exhaust; and directing the mixture of the second portion of the engine exhaust and the air source to an outlet.

Another embodiment includes a device for removing impurities from a gas. The device comprises an inlet for receiving fuel comprising at least one hydrocarbon connected to an engine and a split line to separate a first portion of engine exhaust from a second portion of engine exhaust. The device includes a first outlet to feed a first portion of the engine exhaust to the atmosphere. The device further includes an injector for injecting an air source into a second portion of the engine exhaust, a vessel containing an adsorption media for receiving a mixture of the second portion of the engine exhaust and the air source and a second outlet to feed the reformed gas from the vessel to a vent.

Another embodiment includes a method of removing impurities from a gas, the method comprising the steps of:

receiving fuel comprising at least one hydrocarbon via an engine;

generating an engine exhaust;

directing a first portion of the engine exhaust to the atmosphere;

directing a second portion of the engine exhaust to a heating component;

injecting an air source into the heating component;

heating the air source with the second portion of the engine exhaust;

directing the second portion of the engine exhaust to the atmosphere; and directing the heated air source to a reactor.

Another embodiment of the invention includes a method of directing a first portion of the air source into the heating component;

directing a second portion of the air source towards a reactor; and blending the second portion of the air source with the heated first portion of the air source, and directing the mixture of the first and second air source portions to the reactor.

Another embodiment of the invention is a device for removing impurities from a gas. The device comprises an inlet for receiving fuel comprising at least one hydrocarbon via an engine and a split line to separate a first portion of the engine exhaust from a second portion of the engine exhaust. The device includes a first outlet to feed the first portion of the engine exhaust to the atmosphere, a heating component to receive the second portion of the engine exhaust, and an injector to inject an air source into the heating component. The device further includes a second outlet to direct the second portion of the engine exhaust to the atmosphere and a vessel to receive the air source from the heating component.

Another embodiment of the invention is a method comprising the steps of:

receiving fuel comprising at least one hydrocarbon in a first system line;

directing the fuel to a first reactor containing an adsorption media;

desorbing an impurity from the fuel;

directing the fuel to an engine;

generating an engine exhaust;

directing the engine exhaust to a conditioning unit;

injecting an air source into a second system line;

directing the air source to a heating component;

directing the heated air source to a second reactor;

generating regeneration air in the second reactor;

injecting the regeneration air into the first system line;

mixing the regeneration air with the engine exhaust; and directing the mixture of the regeneration air and engine exhaust to an outlet.

Another embodiment of the invention is a device. The device includes a split line to separate a first system line from a second system line and an inlet for receiving fuel comprising at least one hydrocarbon in the first system line. The device further includes a first reactor in the first system line containing an adsorption media to receive the fuel, an engine in the first system line to receive the fuel from the first reactor and a conditioning unit in the first system line to receive the engine exhaust from the engine. The device also includes a first injector to inject an air source into the second system line, a heating component in the second system line to heat the air source, a second reactor to receive the air source from the heating component and generate a regeneration air, a second injector to inject the regeneration air into the first system line, and an outlet to direct the regeneration air and engine exhaust out of the first system line.

BRIEF DESCRIPTION OF THE DRAWINGS

These and other features of exemplary embodiments of the gas conditioning device, methods and uses thereof will now be described with reference to the drawings of certain embodiments which are intended to illustrate and not to limit the scope of the application.

DETAILED DESCRIPTION

Further aspects, features and advantages will become apparent from the detailed description which follows.

As noted above, in its broader aspects, the embodiments are directed to a method of regenerating media in a biogas purification system and a device for regenerating media for use in biogas purification systems. After the clean-up, the biogas can be used as fuel for internal combustion engines.

Referring to the Figures, wherein like numerals indicate corresponding parts throughout the several views, a regenerating media device 1 constructed in accordance with the embodiments shown in FIGS. 1 to 5.

Figure 1:
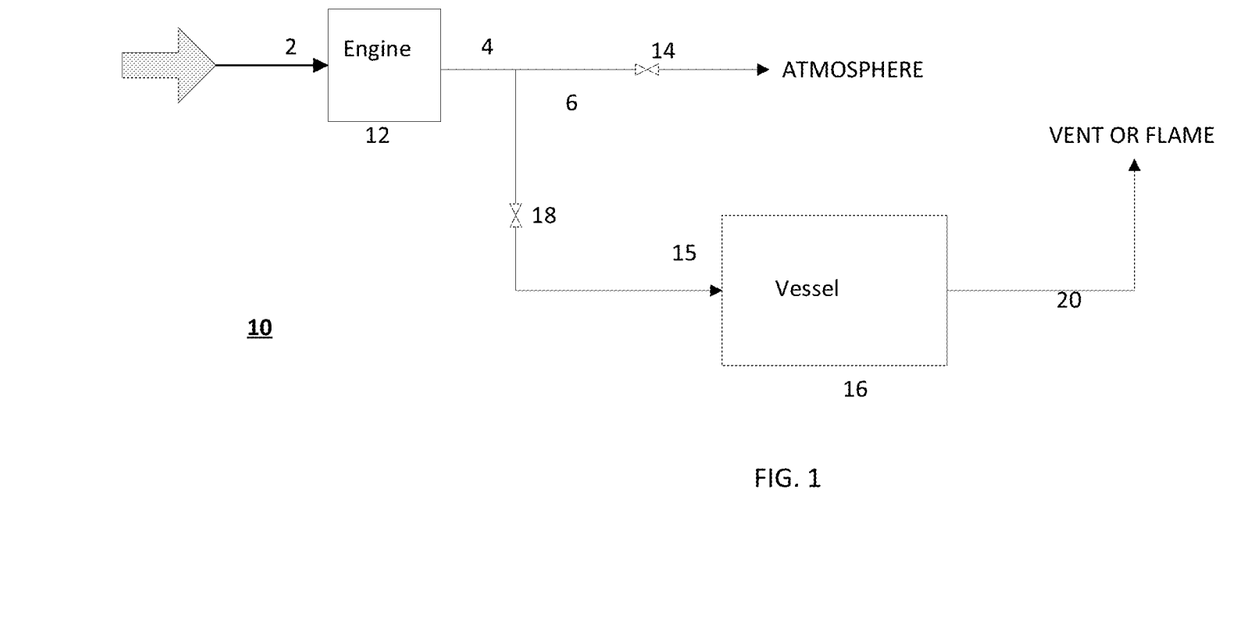
FIG. 1 is an illustration of a media regeneration system.

A system 10 for capturing and conveying engine exhaust from an engine 12 to aid or drive the regeneration of media in a vessel. The system 10 transmits at least a portion of engine exhaust from the engine 12 to the vessel 16 to provide heat and gas to regenerate adsorbing media. The waste gas is then ported to a vent or flame.

As shown in FIG. 1, fuel comprising a hydrocarbon is received in the system at inlet 2. In an embodiment the hydrocarbon is methane. In another embodiment the fuel is a purified biogas. Alternatively, the fuel can be from another source or comprise another material as would be understood by persons of ordinary skill in the art. Once the fuel is received it travels through the fuel system through line 2 to the engine 12. The engine exhaust produced from the engine 12 travels through line 4. The temperature of the engine exhaust produced from the engine 12 is in the range of 120° C. to 550° C., both inclusive. A first portion of the engine exhaust continues to flow through line 4 to the atmosphere. In an exemplary embodiment, the first portion of engine exhaust is 10% to 100% inclusive of the engine exhaust. Optionally, the flow rate of the first portion of the engine exhaust is controlled using a control valve 14. To reduce energy expenditure, the pressure at the inlet (fuel inlet) can be maintained between 0.1 psig and 5 psig, both inclusive. In an exemplary embodiment, the pressure at the inlet is about 0.5 psig.

Optionally, a second portion of the engine exhaust may travel through split line 6 to a vessel 16. In an exemplary embodiment, the second portion of engine exhaust is 0% to 90% of the engine exhaust introduced into the system at split line 6. In an embodiment, the second portion of the engine exhaust is calculated based on the target temperature at the vessel inlet and the engine exhaust temperature according to methods known to persons of ordinary skill in the art. Optionally, the flow rate of the second portion of the engine exhaust at split line 6 is controlled using a control valve 18. To reduce energy expenditure, the pressure at the process vessel inlet can be maintained between 0.1 to 5 psig, inclusive. In an exemplary embodiment, the pressure at the inlet is about 0.5 psig. Optionally, the vessel is a purification vessel. In an exemplary embodiment the purification vessel is a biogas purification vessel.

The second portion of the engine exhaust is fed into a reactor 16 at point 15. In an exemplary embodiment, the second portion of the engine exhaust is fed into the reactor at a temperature of 50° C. to 550° C., both inclusive. In an additional exemplary embodiment, the second portion of the engine exhaust is fed into the reactor at a temperature of 100° C. to 150° C., both inclusive. In an additional exemplary embodiment, the second portion of the engine exhaust if fed in to the reactor at a temperature of 75° C. to 85° C., both inclusive and more preferably at 80° C. In an additional exemplary embodiment, the second portion of the engine exhaust is fed into a reactor 16 containing media that is temperature dependent, such as a polymeric material well known to persons of ordinary skill in the art. In a further exemplary embodiment, the second portion of the engine exhaust is fed into a reactor 16 containing media at a temperature within the range of 50° C. to 550° C., both inclusive. Optionally, the media can be a polymer media, a silica gel media, an alumina based media or a zeolite media. In an embodiment, the temperature range of the second portion of the engine exhaust may be in the range of 50° C. to 150° C., both inclusive for a polymer media. In another embodiment, the temperature range of the second portion of the engine exhaust may be in the range of 300° C. to 500° C., both inclusive for an alumina based adsorbent (media), a silica gel media or a zeolite media. The pressure at the outlet can be between 0 psig and 5 psig, both inclusive. In one aspect, the second portion of the engine exhaust is fed into the reactor at a pressure of about 0.5 psig.

The reactor 16 may contain adsorption media, residue biogas, water, siloxanes, halogenated compounds, hydrogen sulfide and other organic components. The second portion of the engine exhaust is below 550° C. In an exemplary embodiment the second portion of the engine exhaust is at a temperature in the range of 50° C. to 550° C., both inclusive. In an another embodiment, the second portion of the engine exhaust is calculated based on the target temperature at the vessel inlet and media type in the reactor according to methods known to persons of ordinary skill in the art. Optionally, the media can be a polymer media, a silica gel media, an alumina based media or a zeolite media. In one aspect of the invention the second portion of the engine exhaust is fed into the vessel in a temperature range suitable for the adsorbents (media) within the vessel. For example, the second portion of the engine exhaust is fed into the vessel at a temperature within the range of 50° C. to 550° C., both inclusive. In an embodiment, the temperature range of the second portion of the engine exhaust may be in the range of 50° C. to 150° C., both inclusive for a polymer media. In another embodiment, the temperature range of the second portion of the engine exhaust may be in the range of 300° C. to 500° C., both inclusive for an alumina based adsorbent (media), a silica gel media or a zeolite media. The second portion of the engine exhaust may contain at least one of carbon dioxide, nitrogen, oxygen, water vapor, nitrogen oxide and unburnt hydrocarbons. The second portion of the engine exhaust passes through the reactor and is directed out of the reactor 16 through outlet 20 to a vent or flame. In an exemplary embodiment, the engine exhaust includes CO2, hydrocarbons (HC) and desorbed siloxanes and VOCs. In one aspect, the second portion of the engine exhaust passes over the media in the vessel 16 causing the adsorbed species to desorb. In an embodiment, at least one of a siloxane, volatile organic compound, and hydrogen sulfide may be desorbed from the second portion of the engine exhaust.

Figure 2:
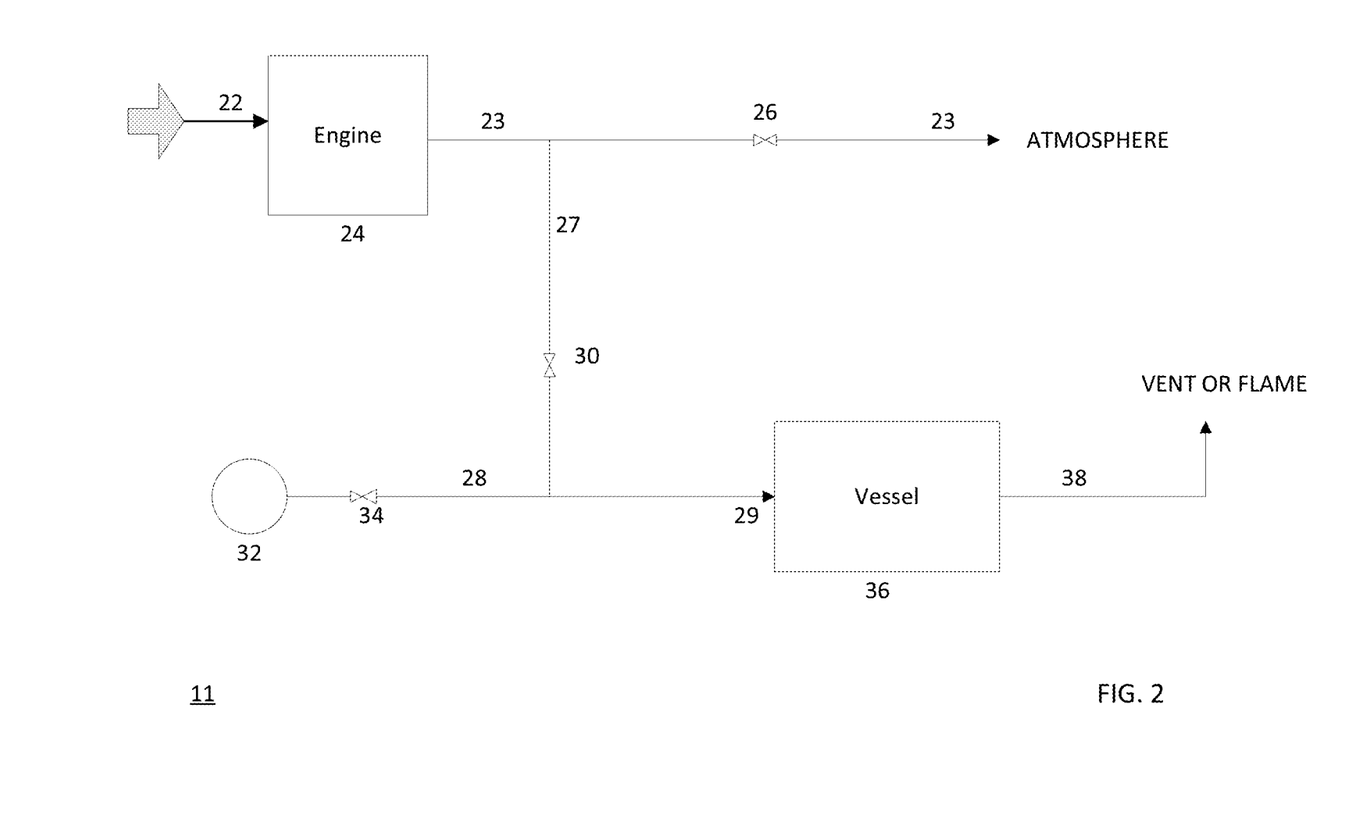
FIG. 2 is an illustration of an alternative embodiment of a media regeneration system.

Another embodiment of the invention is a system 11 for capturing and conveying engine exhaust from an engine 24 to aid or drive a process in a vessel. The system 11 transmits at least a portion of engine exhaust from the engine 24 to the vessel 36 to provide heat and gas to the vessel. The waste gas is then ported to a vent or flame. In an embodiment the vessel 36 is a process vessel. In a preferred embodiment the vessel 36 is a reactor.

FIG. 2 is an embodiment of the invention which uses engine exhaust to regenerate media. As shown in FIG. 2, once the fuel is received it travels through the system 11 through line 22 to the engine 24. The engine exhaust produced from the engine 24 travels through line 23. The temperature of the engine exhaust produced from the engine 24 is in the range of 120° C. to 550° C., both inclusive. In an exemplary embodiment, the temperature of the engine exhaust produced from the engine 24 is in the range of 120° C. to 550° C., both inclusive. A first portion of the engine exhaust continues to flow through line 23 to the atmosphere. In an exemplary embodiment, the first portion of engine exhaust is 10% to 100% of the engine exhaust. In an exemplary embodiment the first portion of the engine exhaust is calculated based on the target temperature at the line inlet and the engine exhaust temperature according to methods known to persons of ordinary skill in the art. Optionally, the flow rate of the first portion of the engine exhaust is controlled using a control valve 26. To reduce energy expenditure, the pressure at the vessel inlet can be maintained between 0 psig and 5 psig, both inclusive In an exemplary embodiment, the pressure at the inlet is about 0.5 psig.

Optionally, a second portion of the engine exhaust may travel through a split line 27. In an exemplary embodiment, the second portion of engine exhaust is 0% to 90%, both inclusive of the engine exhaust introduced into the system. In an additional exemplary embodiment, the second portion of engine exhaust is 2% to 5%, both inclusive of the engine exhaust introduced into the system. Optionally, the flow rate of the second portion of the engine exhaust is controlled using a control valve 30. To reduce energy expenditure, the pressure at the vessel inlet can be maintained between 0 psig and 5 psig, inclusive In an exemplary embodiment, the pressure at the inlet is about 0.5 psig.

An air source is injected into the second portion of engine exhaust at injection point 32 by various means. Injector point 32 could be a venturi, a blower or an air compressor. The venturi, also known as a venturi-ejector or an ejector or a jet compressor, injects an air source into the device at line 28. The amount of the air source fed into the injector point 32 can be controlled using a control valve 34 to achieve desired air source/second portion of the engine exhaust ratio. The objective of the mixing is to achieve the desired gas temperature at the inlet of the process vessel 36. In an exemplary embodiment, the temperature at inlet 29 is 50° C. to 550° C., both inclusive. In another exemplary embodiment the temperature at inlet 29 is 50° C. to 100° C., both inclusive. In a preferred exemplary embodiment, the temperature at inlet 29 is 80° C. Further, in one aspect of the invention the second portion of the engine exhaust is fed into the vessel containing an adsorbent (media). Optionally, the media can be a polymer media, a silica gel media, an alumina based media or a zeolite media. In one aspect of the invention the second portion of the engine exhaust is fed into the vessel in a temperature range suitable for the adsorbents (media) within the vessel. For example, the second portion of the engine exhaust is fed into the vessel at a temperature within the range of 50° C. to 550° C., both inclusive. In an embodiment, the temperature range of the second portion of the engine exhaust may be in the range of 50° C. to 150° C., both inclusive for a polymer media. In another embodiment, the temperature range of the second portion of the engine exhaust may be in the range of 300° C. to 500° C., both inclusive for an alumina based adsorbent (media), a silica gel media or a zeolite media. The ratio of the air source to the second portion of the engine exhaust depends on the temperature of the engine exhaust and ambient air. In an exemplary embodiment the ratio of the air source to the second portion of the engine exhaust is in the range of 0 to 5. In a preferred exemplary embodiment, the ratio of the air source to the second portion of the engine exhaust ratio is 2 to 4. In an exemplary embodiment, the air source is injected via a venturi. The operation of the venturi is more or less similar to that of the carburetor. The venturi is a substitute to a compressor, which requires the power to inject the low pressure air source into the second portion of the engine exhaust. A venturi is a completely mechanical unit, which avoids the power required as well as limits the air source flow to the maximum designed condition. Specifically, the size of the throat, plays an important role in selecting the maximum limit for the air source to second portion of the engine exhaust which is an important process parameter. Also the pressure of the air source fed into injector point 32 is determined by the design and the selection of the right kind of venturi. Examples of the non flammable gas source include atmospheric air, compressed air, any type of compressed gas such as carbon dioxide, air, argon, or helium.

The temperature of the second portion of the engine exhaust is decreased by blending the air source with the second portion of the engine exhaust. In an embodiment, the temperature of the second portion of the engine exhaust is reduced to a temperature in the range of 50° C. to 500° C., both inclusive. In an additional exemplary embodiment, the second portion of the engine exhaust is in the range of 50 C to 200° C., both inclusive. In an additional exemplary embodiments the second portion of the engine exhaust is in the range of 50 C to 150° C., both inclusive, 300° C. to 375° C., both inclusive or 400° C. to 500° C., both inclusive. The second portion of the engine exhaust continues through the system in line 29 to a vessel 36. The pressure at the inlet leading into the vessel 36 can be between 0 psig and 5 psig, both inclusive. In one aspect, the second portion of the engine exhaust is fed into the vessel at a pressure of about 0.5 psig. The vessel 36 may contain adsorption media, residue biogas, water, siloxanes, halogenated compounds, hydrogen sulfide and other organic components. Further, in one aspect of the invention the second portion of the engine exhaust is fed into the vessel containing an adsorbent (media). Optionally, the media can be a polymer media, a silica gel media, an alumina based media or a zeolite media. In one aspect of the invention the second portion of the engine exhaust is fed into the vessel in a temperature range suitable for the adsorbents (media) within the vessel. For example, the second portion of the engine exhaust is fed into the vessel at a temperature within the range of 50° C. to 550° C., both inclusive. In an embodiment, the temperature range of the second portion of the engine exhaust may be in the range of 50° C. to 150° C., both inclusive for a polymer media. In another embodiment, the temperature range of the second portion of the engine exhaust may be in the range of 300° C. to 500° C., both inclusive for an alumina based adsorbent (media), a silica gel media or a zeolite media. In one aspect, the second portion of the engine exhaust passes over the media in the vessel 36 causing the siloxanes and other adsorbed species to desorb, including volatile organic compounds, hydrogen sulfide, etc. The second portion of the engine exhaust is directed out of the vessel 36 through outlet 38 to a vent or flame. The engine exhaust, mixed with air from the air source 32, at outlet 38 contains impurities that are removed from the adsorbents (media) in the vessel 36. The impurities include siloxanes and VOCs. The temperature of the engine exhaust at outlet 38 is generally lower than inlet 29, due to heat loss across the vessel 36. In an embodiment the flame helps to abate the emissions of organic compounds.

Figure 3:
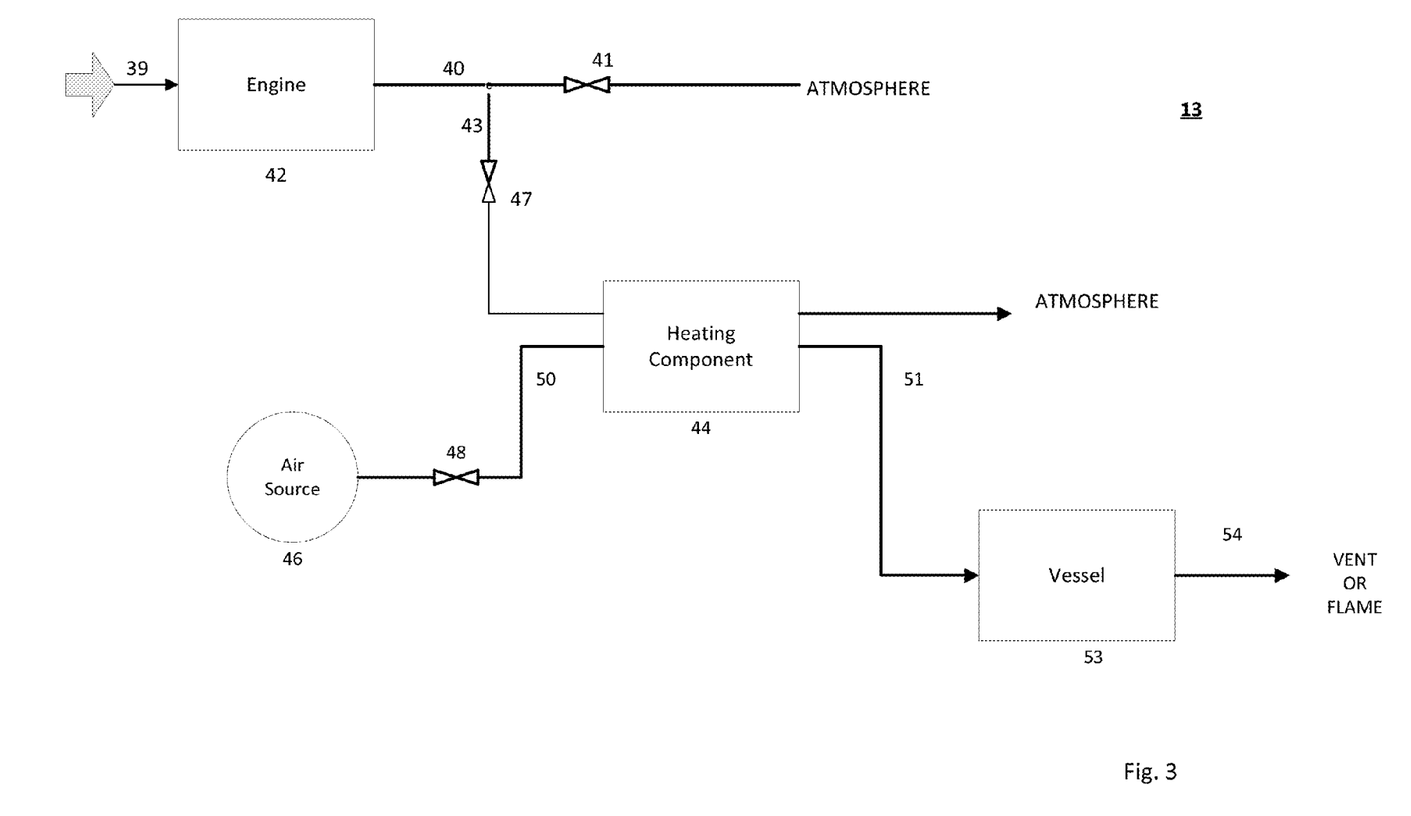
FIG. 3 is an illustration of an alternative embodiment of a media regeneration system.

Another embodiment of the invention is a system 13 for capturing and conveying engine exhaust from an engine 42 to aid or drive a temperature change in an air source. The system 13 transmits at least a portion of engine exhaust from the engine 42 to a heating component 44 to provide heat to the heating component 44. The waste gas is then ported to the atmosphere and the heated air source is directed to a vessel 53 to provide heat and gas to the vessel. In an embodiment the vessel 53 is a process vessel. In a preferred embodiment the vessel 53 is a reactor.

As shown in FIG. 3, once the fuel is received into the system at inlet 39 it travels through the system 13 to the engine 42. The engine exhaust produced from the engine travels through line 40. The temperature of the engine exhaust produced from the engine 42 is in the range of 120° C. to 550° C., both inclusive. A first portion of the engine exhaust continues to flow through line 40 to the atmosphere. In an exemplary embodiment, the first portion of engine exhaust is 10% to 100% inclusive of the engine exhaust. Optionally, the flow rate of the first portion of the engine exhaust is controlled using a control valve 41. To reduce energy expenditure, the pressure at the inlet (fuel inlet) can be maintained between 0.1 psig and 5 psig, both inclusive. In an exemplary embodiment, the pressure at the inlet is about 0.5 psig.

Optionally, a second portion of the engine exhaust may travel through split line 43 to a heating component 44 such as a heat exchanger or an electric heater. As a non-limiting example, the heating component can be a single heating component or a series of heating component. The heating component can be any heat exchange device known to those of ordinary skill in the art. In an exemplary embodiment, the heating component 44 can be a shell and tube heat exchanger or another heat exchanger design that does not allow the mixing of gas sources but permits the transfer of heat between the gas sources. When the heating component comprises a shell and tube heat exchanger, heating can be obtained with a hot fluid such as the second portion of the engine exhaust. In an embodiment, the second portion of the engine exhausts is fed into a first portion of the heating component. The second portion of the engine exhaust is then directed out of the heating component to the atmosphere.

In an exemplary embodiment, the second portion of engine exhaust is 0% to 90% of the engine exhaust introduced into the system at split line 43. In an additional embodiment, the second portion of engine exhaust is 5% to 10% of the engine exhaust introduced into the system at split line 43. Optionally, the flow rate of the second portion of the engine exhaust at split line 43 is controlled using a control valve 47. To reduce energy expenditure, the pressure at the process vessel inlet can be maintained between 0.1 to 5 psig, inclusive. In an exemplary embodiment, the pressure at the inlet is about 0.5 psig.

Optionally, an air source is injected into the heating component 44 at point 46 by various means. In one aspect of the invention, the injector point 46 could be an air blower or a compressor. The amount of the air source fed into the injector point 46 can be controlled using a control valve 48. In an embodiment, the air source travels through the system through line 50 to the heating component 44. In an embodiment, the air source is fed into a second portion of the heating component. In an embodiment, the temperature of the air source is increased as a result of heat transfer between the engine exhaust and the air source. In an exemplary embodiment, the temperature of the air source is increased to a temperature in the range of 50° C. to 550° C., both inclusive. In an additional exemplary embodiment, the air source is increased to a temperature in the range of 50° C. to 150° C., both inclusive. In an additional exemplary embodiment, the air source is increased to a temperature in the range of 300° C. to 500° C., both inclusive. The air source continues through the system in line 51 to a reactor 53. The pressure at the outlet leading into the reactor 53 can be between 0 psig and 100 psig, both inclusive. In one aspect, the second portion of the engine exhaust is fed into the heating component 44 at a pressure of about 0.5 psig. The reactor 53 may contain adsorption media, residue biogas, water, siloxanes, halogenated compounds, hydrogen sulfide and other organic components. The air is directed out of the reactor 53 through outlet 54 to a vent or flame. The air at outlet 54 contains desorbed impurities that are originated from biogas during the process mode.

Figure 4:
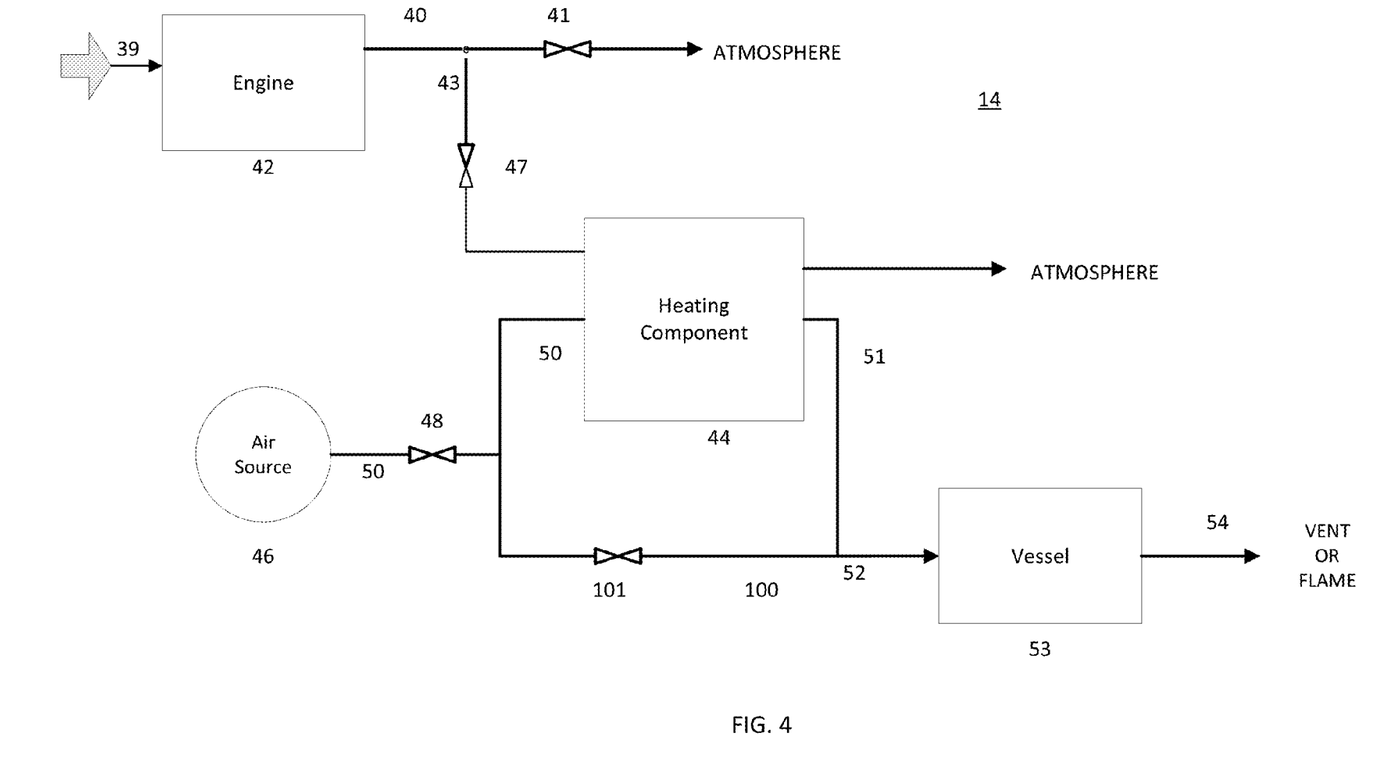
FIG. 4 is an illustration of an alternative embodiment of a media regeneration system.

Optionally, as shown in FIG. 4, once the fuel is received into the system at inlet 39 it travels through the system 14 through to the engine 42. The engine exhaust produced from the engine travels through line 40. The temperature of the engine exhaust produced from the engine 42 is in the range of 120° C. to 550° C., both inclusive. In an exemplary embodiment, the engine exhaust produced from the engine 42 is in the range of 300° C. to 500° C., both inclusive. Optionally, the engine exhaust produced from the engine 42 is dependent upon the engine type and the duty cycle. A first portion of the engine exhaust continues to flow through line 40 to the atmosphere. In an exemplary embodiment, the first portion of engine exhaust is 0% to 90% both inclusive of the engine exhaust. Optionally, the flow rate of the first portion of the engine exhaust is controlled using a control valve 41. To reduce energy expenditure, the pressure at the inlet (fuel inlet) can be maintained between 0.1 psig and 5 psig, both inclusive. In an exemplary embodiment, the pressure at the inlet is about 0.5 psig.

A second portion of the engine exhaust continues through split line 43 the engine exhaust produced from an engine 42 proceeds to a heating component 44 such as a heat exchanger. In an exemplary embodiment, the second portion of engine exhaust is 10% to 100% inclusive of the engine exhaust. As a non-limiting example, the heating component can be a single heating component or a series of heating component. The heating component can be any heat exchange device known to those of ordinary skill in the art. In an exemplary embodiment, the heating component 44 can be a shell and tube heat exchanger or another heat exchanger design that does not allow the mixing of gas sources but permits the transfer of heat between the gas sources. When the heating component comprises a shell and tube heat exchanger, heating can be obtained with a hot fluid such as the second portion of the engine exhaust. In an embodiment, the second portion of the engine exhaust is fed into a first portion of the heating component. The second portion of the engine exhaust is then directed out of the heating component 44 to the atmosphere.

An air source is injected into the heating component 44 at point 46 by various means and it travels through the system 14 through line 50. In one aspect of the invention, the injector point 46 could be an air blower or a compressor. The amount of the air source fed into the injector point 46 can be controlled using a control valve 48. In an embodiment, a first portion of the air source travels through the system through line 50 to the heating component 44. In an exemplary embodiment, the first portion of the air is 10% to 100%, both inclusive. In an embodiment, the temperature of the first portion of the air source is increased as a result of heat transfer between the engine exhaust and the first portion of the air source. In an exemplary embodiment, the temperature of the first portion air source is increased to a temperature in the range of 50° C. to 550° C., both inclusive. In an additional exemplary embodiment, the first portion of the air source is increased to a temperature in the range of 50° C. to 150° C., both inclusive. In another exemplary embodiment the first portion of the air source is increased to a temperature in the range of 300° C. to 500° C. The first portion of the air source continues through the system in line 51.

Optionally, a second portion of the air source may travel through split line 100. In an exemplary embodiment, the second portion of engine exhaust is 0% to 90% inclusive of the air source. The second portion of the air source continues to split line 100 and is fed into line 51 at a point 52 where it is blended with a first portion of the air source to provide additional temperature control. The combined first air source portion and second air source portion are fed into a vessel 53. In an exemplary embodiment, the second portion of the air source is blended with the first portion of the air source resulting in a blended first and second portion of the air source having a temperature in the range of 50° C. to 550° C., both inclusive. In an additional exemplary embodiment, the first and second portions of the air source are blended resulting in a combined first and second air source having a temperature in the range of 50° C. to 150° C., both inclusive. In an additional exemplary embodiment, the first and second portions of the air source are blended resulting in a combined first and second air source having a temperature in the range of 300° C. to 500° C., both inclusive.

The pressure at the point leading into the vessel 53 can be between 0 psig and 100 psig, both inclusive. In one aspect, the heated air at line 51 is fed into the vessel at a pressure of about 0.5 psig. The vessel 53 may contain adsorption media, residue biogas, water, siloxanes, halogenated compounds, hydrogen sulfide and other organic components. The air is directed out of the vessel 53 through outlet 54 to a vent or flame. The air at outlet contains desorbed impurities that are originated from biogas during the process mode.

The flow rate of the second portion of the air can be controlled by valve 101. The ratio between the first and second portion of the air can be adjusted to achieve the desired temperature at the inlet of the vessel 52.

Figure 5:
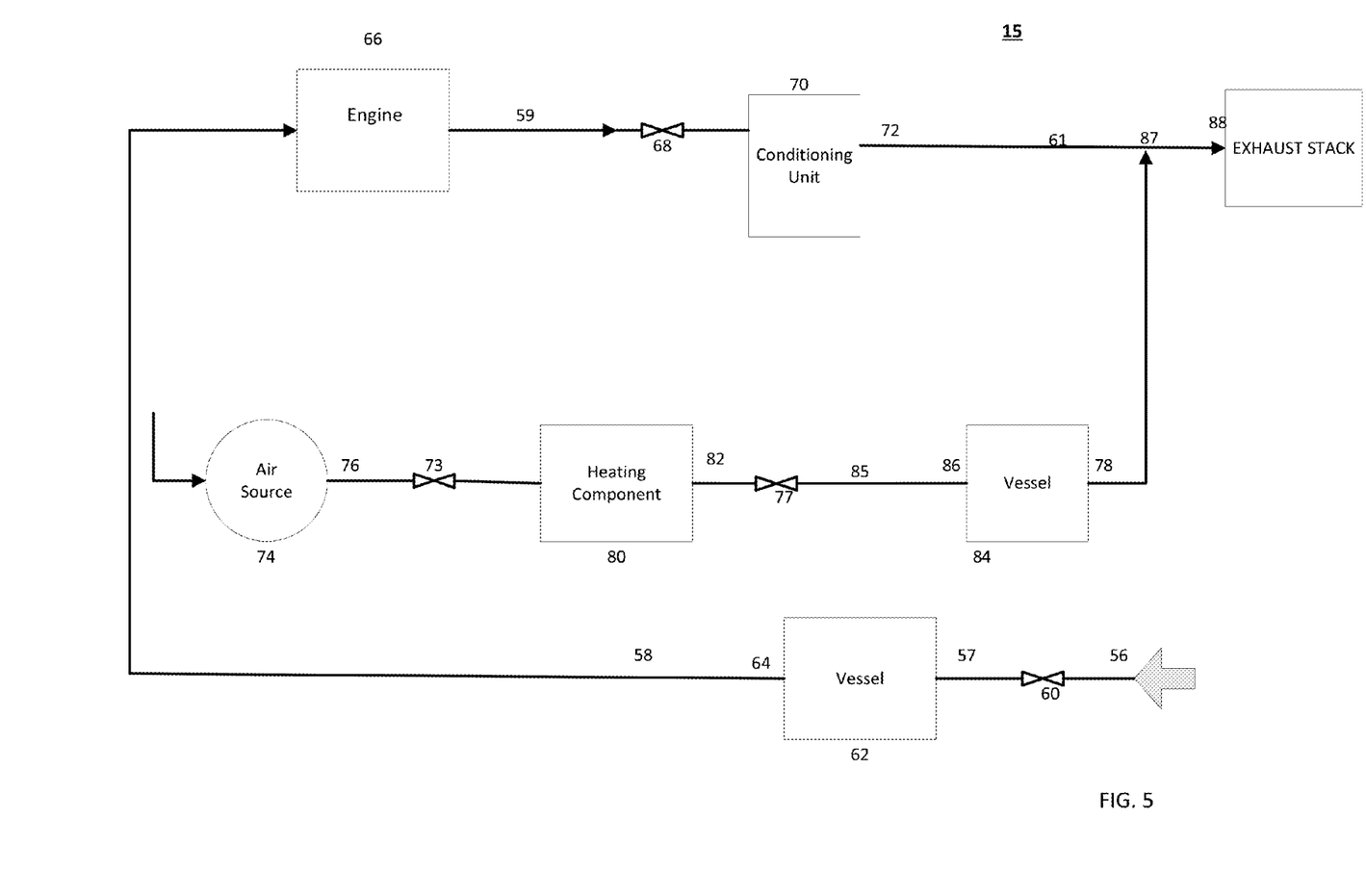
FIG. 5 is an illustration of yet another alternative embodiment of a media regeneration system.

Another embodiment of the invention is a system 15 for reducing emission at an exhaust point 88. In the system, engine exhaust is conditioned in a conditioning unit 70 to reduce impurities in the engine exhaust. The conditioned engine exhaust is mixed with an air source directed through a vessel 62 and then the mixture of the engine exhaust and the air source is directed to an outlet of the system. The resulting mixture of engine exhaust and the air source has reduction in the VOC emissions.

FIG. 5 is another embodiment of the invention. As shown in FIG. 5, fuel gas comprising at least one hydrocarbon is received in the system 15 at inlet 56. Once the fuel gas is received it travels through the system through line 57. The fuel gas intake pressure is optionally regulated by valve 60. The fuel gas continues to flow through line 57 to undergo a process in a first vessel 62. The fuel gas exits the reactor at outlet 64. In one aspect of the invention, first vessel 62 is a reactor. In an exemplary embodiment of the invention, the fuel gas undergoes a cleaning process in the first reactor. In another aspect of the invention, the cleaning process involves the removal of siloxanes from the fuel gas in the reactor. The fuel gas continues through line 58 and is fed into an engine 66. Engine exhaust flows out of the engine 66 and travels through the system through line 59. Optionally, the flow rate of the engine exhaust is controlled using a first valve 68. To reduce energy expenditure, the pressure at the inlet valve 68 can be maintained between 0 psig and 5 psig, both inclusive. In an exemplary embodiment, the pressure at the inlet is about 0.5 psig.

The engine exhaust continues through the system through line 59 and is received by a conditioning unit 70. In one aspect of the invention, the conditioning unit contains at least one catalyst to obtain a conditioned gas with a reduction of carbon monoxide and VOCs (volatile organic compounds). In another aspect of the invention, the catalyst comprises platinum, palladium, rhodium, alumina, rare earth elements and mixtures thereof. In another embodiment, the catalyst is an oxidation catalyst. In another embodiment, the catalyst reduces CO, and comprises VOCs. Optionally, the temperature of the engine exhaust at the condition unit is in the range of 120° C. to 550° C., both inclusive. In an exemplary embodiment, the engine exhaust at the condition unit is in the range of 300° C. to 550° C., both inclusive. The conditioned engine exhaust exits the condition unit at outlet 72 and proceeds through line 61 to an exit point 88. In one aspect of the invention, the exit point is an engine exhaust stack.

Optionally, an air source is inserted to the system at an injector point 74 by various means. In an embodiment of the invention, the injector point is an air blower or compressor 74. Once received in the system, the air source travels through the system through line 76. The air source intake pressure is optionally regulated by valve 73. The air source travels through line 76 and is fed into a heating component 80 such as a heat exchanger or an electric heater. In an embodiment, the heating component 80 increases temperature of the air source to a temperature in the range of 50° C. to 550° C. In another embodiment the temperature of the air source is in the range of 50° C. to 150° C. In another embodiment the temperature of the air source is in the range of 300° C. to 500° C. The air source exits the heating component at a point 82 as regeneration air.

The air source travels through the system through line 85. The air source is fed into a second vessel 84 at point 86. In an embodiment, the air source can be used to regenerate contaminated media in a second vessel 84. In an embodiment the second vessel is a reactor. The regeneration air exits the second vessel 84. In an embodiment the regeneration air removes impurities. In an exemplary embodiment, the regeneration air removes siloxanes and VOCs from the media in vessel 84.

The regenerated air continues to travel through the system through line 78. In an embodiment, the regeneration air is injected to line 61 of the system at point 87. In an exemplary embodiment, the regeneration air is injected into line 61 downstream of the conditioning unit 70. The regenerated air then exits out the system through exit point 88. In an embodiment the exit point is an exhaust stack. In an exemplary embodiment the exit point is the same exit point as the engine exhaust generated from the engine.

What is claimed is:

1. A method of removing impurities from a gas for use as a fuel in an internal combustion engine, the method comprising the steps of:
   receiving fuel comprising at least one hydrocarbon via the engine;
   generating an engine exhaust;
   directing a first portion of the engine exhaust to the atmosphere;
   directing a second portion of the engine exhaust to a heating component;
   injecting an air source into the heating component;
   heating the air source with the second portion of the engine exhaust;
   directing the second portion of the engine exhaust from the heating component to the atmosphere; and
   directing the heated air source to a reactor.

2. The method according to claim 1, further comprising the steps of:
   directing a first portion of the air source into the heating component;
   directing a second portion of the air source towards a reactor; and
   blending the second portion of the air source with the heated first portion of the air source; and
   directing the mixture of the first and second air source portions to the reactor.

3. The method according to claim 1 wherein the heating component is a one of a heat exchanger or a shell and tube heat exchanger.

4. The method according to claim 1 wherein the engine exhaust has a temperature in the range of 120° C. to 550° C., both inclusive.

5. The method according to claim 1 wherein the air source directed out of the heating component has a temperature in the range of 50° C. to 550° C., both inclusive.

6. A device for removing impurities from a gas for use as a fuel in an internal combustion engine, the device comprising:
   an inlet for receiving fuel comprising at least one hydrocarbon via the engine;

a split line to separate a first portion of the engine exhaust from a second portion of the engine exhaust;

a first outlet to feed the first portion of the engine exhaust to the atmosphere;

a heating component to receive the second portion of the engine exhaust;

an injector to inject an air source into the heating component;

a second outlet to direct the second portion of the engine exhaust from the heating component to the atmosphere; and a reactor to receive the air source from the heating component.

7. The method of claim 1, further wherein the reactor comprises adsorption media.

8. The method of claim 7, further wherein the adsorption media is selected from polymer media, silica gel media, alumina based media, or zeolite media.

9. The device of claim 6, further wherein the reactor comprises adsorption media.

10. The device of claim 9, further wherein the adsorption media is selected from polymer media, silica gel media, alumina based media, or zeolite media.

* * * * *